(12) United States Patent
Murcin

(10) Patent No.: US 11,354,976 B1
(45) Date of Patent: Jun. 7, 2022

(54) DATA ANALYTICS FOR DAILY FANTASY SPORTS GAMES

(71) Applicant: David C. Murcin, Los Angeles, CA (US)

(72) Inventor: David C. Murcin, Los Angeles, CA (US)

( * ) Notice: Subject to any disclaimer, the term of this patent is extended or adjusted under 35 U.S.C. 154(b) by 0 days.

(21) Appl. No.: 16/830,161

(22) Filed: Mar. 25, 2020

Related U.S. Application Data

(63) Continuation-in-part of application No. 15/179,845, filed on Jun. 10, 2016, now Pat. No. 10,610,790.

(51) Int. Cl.
*A63F 13/65* (2014.01)
*G07F 17/32* (2006.01)

(52) U.S. Cl.
CPC ........ *G07F 17/323* (2013.01); *G07F 17/3223* (2013.01); *G07F 17/3288* (2013.01)

(58) Field of Classification Search
None
See application file for complete search history.

(56) References Cited

U.S. PATENT DOCUMENTS

| | | | | |
|---|---|---|---|---|
| 8,099,182 B1 * | 1/2012 | Kasten | ............. | A63F 13/65 700/91 |
| 8,447,420 B2 * | 5/2013 | Bloodworth | ............. | A63F 9/24 700/91 |
| 9,767,350 B2 * | 9/2017 | Rodriguez | ............. | G16H 40/67 |
| 2006/0183548 A1 * | 8/2006 | Morris | ............. | G07F 17/32 463/42 |
| 2008/0076497 A1 * | 3/2008 | Kiskis | ............. | G07F 17/32 463/9 |
| 2008/0125228 A1 * | 5/2008 | Ware | ............. | A63F 13/12 463/42 |
| 2008/0281444 A1 * | 11/2008 | Krieger | ............. | A63F 13/828 700/91 |
| 2013/0045806 A1 * | 2/2013 | Bloodworth | ............. | G07F 17/32 463/43 |
| 2014/0004939 A1 * | 1/2014 | Kasten | ............. | A63F 13/00 463/30 |
| 2014/0045595 A1 * | 2/2014 | Baschnagel, III | ............. | A63F 13/79 463/40 |
| 2014/0302914 A1 * | 10/2014 | Weinstein | ............. | G07F 17/3288 463/25 |
| 2015/0131845 A1 * | 5/2015 | Forouhar | ............. | G06F 16/71 382/100 |
| 2016/0263483 A1 * | 9/2016 | Le | ............. | A63F 13/65 |

* cited by examiner

*Primary Examiner* — Sunit Pandya

(57) ABSTRACT

Data analytics for a daily fantasy sports game having a salary cap is performed. From an online prediction-based game having a game period, sets of predictions are continuously collected from a multitude of online players prior to start of the daily fantasy sports game. The sets include numerical predictions of performances of a plurality of different athletes at different positions in different performance categories in at least one sporting event. The predictions are locked at a predetermined time prior to the start of the game period. Statistics of the predictions that have been collected from the online players are visually displayed to the online players after the locking but before the start of the game period. The visually displayed statistics include statistical modes.

18 Claims, 3 Drawing Sheets

DATA ANALYTICS FOR DAILY FANTASY SPORTS GAMES

BACKGROUND

In traditional fantasy sports games, players compete against others by building a team of professional athletes from a particular league or competition while remaining under a salary cap, and earn points based on the actual statistical performance of the players in real-world competitions. In daily fantasy sports games, players compete over short-term periods, such as a week or single day of competition, as opposed to those that are played across an entire season. Daily fantasy sports games are typically structured in the form of paid competitions typically referred to as a "contest." Winners receive a share of a pre-determined pot funded by their entry fees.

DETAILED DESCRIPTION

Figure 1:
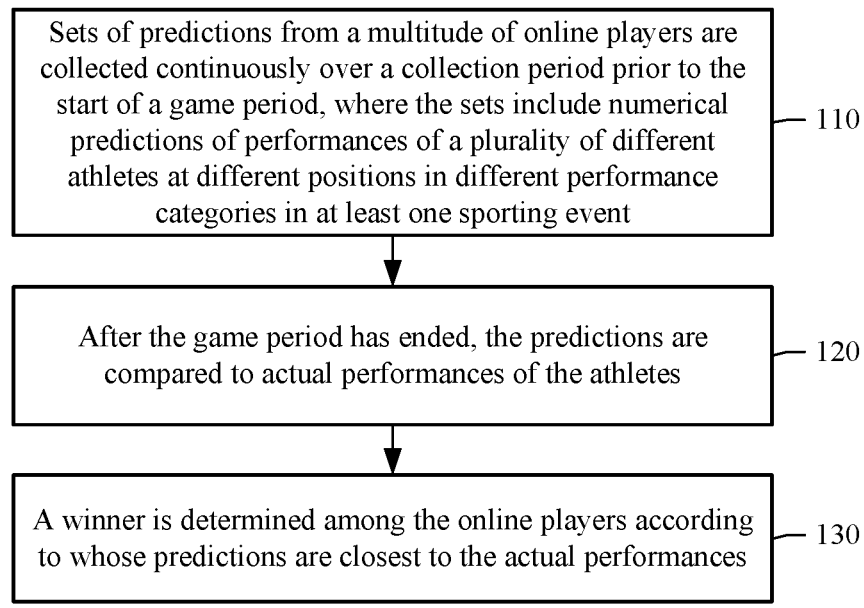
FIG. 1 is an illustration of a prediction-based online game of skill.

Reference is made to FIG. 1, which illustrates a prediction-based online game of skill. The game is one of skill because the outcome is determined mainly by mental skill of online players, rather than by chance.

At block 110, sets of predictions from a multitude of online players are collected continuously over a collection period prior to the start of a game period. The sets include numerical predictions of performances of a plurality of different athletes at different positions in different performance categories in at least one sporting event.

Examples of sporting events include, without limitation, team sports such as football, baseball, basketball, soccer, and hockey. Further examples of sporting events include, without limitation, individual sporting events such as boxing, mixed martial arts (MMA), and horse racing. Sporting events may be professional and/or collegiate. Sporting events may be real events and/or eSports. eSports as used herein refers to video games (e.g., League of Legends and Counter-Strike).

Those people participating in real sporting events are referred to as athletes. For instance, Tom Brady, quarterback of the New England Patriots, is an athlete. Those people playing and competing in eSports (as themselves or as game characters) are also referred to as athletes. Thus, an athlete as used herein may be real or virtual.

As used herein, the term "multitude of players" means at least on the order of thousands of players. The multitude of players could be thousands of players, tens of thousands of players, hundreds of thousands of players, or more.

As used herein, a "game period" refers to a period of time during which a roster of athletes performs only once. Each of the at least one sporting events occurs only once during the game period. Consequently, an athlete will perform only once during the game period. In baseball, the performance may be daily. In football, the performance may be weekly. The game period starts after the collection period has ended.

As used herein, a performance category refers to the acts being predicted. For example, if a selected athlete is a quarterback, performance categories may include passes attempted, passes completed, passing yards, and passing touchdowns. An online player predicts a number for each of these categories. If a selected athlete is a basketball player, performance categories may include number of points scored, number of assists, number of rebounds, and number of steals.

The online players may select rosters of athletes at different positions, where each position has its own performance categories. Each sport may have tens or hundreds of possible performance categories. The following tables provide examples of rosters and performance categories for different sporting events. The numbers in parentheses represent the number of athletes selected.

TABLE 1

| National Football League (NFL) | |
| --- | --- |
| Quarterback (1) | Pass Attempts |
| | Pass Completions |
| | Passing Yards (Total) |
| | Passing Touchdowns |
| Running Backs (2) | Rushing Attempts |
| | Rushing Yards |
| | Rushing Touchdowns |
| Wide Receiver (1) | Receptions |
| | Receiving Yards |
| | Touchdown Receptions |
| Tight End (1) | Receptions |
| | Receiving Yards |
| | Touchdown Receptions |
| Flex Position (1): RB or WR or TE | Receptions |
| | Rushing Yards |
| | Receiving Yards |
| | Touchdowns |
| Defensive Unit (1) | Sacks |
| | Interceptions |
| Kicker (1) | Field Goal Yardage |
| | Points After Touchdown |

TABLE 2

| Major League Baseball (MLB) | | |
| --- | --- | --- |
| Pitcher (1) | | Number of Innings Pitched |
| | | Number of Strikeouts |
| Batters (8): | Catcher; 1st Base; 2nd Base; | Numbe of Hits |
| | 3rd Base; Left Field; | Number of Runs Scored |
| | Center Field; Right Field | Number of RBIs |

TABLE 3

| National Basketball Association (NBA) | |
| --- | --- |
| Point Guard (1) | Number of Points Scored |
| Shooting Guards (2) | Number of Assists |
| Small Forwards (2) | Number of Rebounds |
| Power Forwards (2) | Number of Steals |
| Center (1) | |

TABLE 4

| Soccer | |
| --- | --- |
| Goalkeeper (1) | Number of Shots on Goal Against |
| | Number of Goals Against |
| | Number of Penalty Kick Saves |
| Forwards (2) | Number of Shots |

TABLE 4-continued

Soccer

| | |
|---|---|
| Midfielders (2) | Number of Shots on Goal |
| Defenders (2) | Number of Goals |
| Flex Player (1): Forward, Midfielder or Defender | Number of Assists |

TABLE 5

National Hockey League (NHL)

| | |
|---|---|
| Goalies (2) | Number of Shots on Goal Against |
| | Number of Goals Against |
| Centers (2) | Number of Shots on Goal |
| Left/Right Wingers (3) | Number of Goals |
| Defensemen (2) | Number of Assists |

TABLE 6 eSports

| | |
|---|---|
| Players (5): Top; Jungle; Mid; ADC; Support | Kills |
| | Assists |
| Flex player (1) | Kills |
| | Assists |
| Team Slot (1) | Turrets |
| | Dragons |
| | Barons |

A set of predictions is not limited to athletes from the same team in the same sporting event. Each online player is free to select athletes from across different teams, as long as the athletes perform during the same game period. A player may select an athlete once per game period.

At block 120, after the game period has ended, the predictions are compared to actual performances of the athletes.

At block 130, a winner is determined among the players according to whose predictions are closest to the actual performances. For instance, the online player whose aggregate predictions come closest to the aggregate actual performances is declared the winner. Consider the following simple example involving two players: A first player selects a quarterback and predicts that the quarterback will complete 8 of 12 passes for 150 yards and 1 touchdown. A second player selects the same quarterback, and makes a prediction of 7/12 for 120 yards and 0 touchdowns. During the game period, the quarterback actually completes 6 of 12 passes for 150 yards and 3 touchdowns. The first player's aggregate predictions come closest to the aggregate actual performances. Therefore, the first player wins.

In real situations, there will be multitudes of players, each submitting numerical predictions for different athletes playing different positions. The examples in the tables above are more representative of the predictions by each of the multitude of players.

The prediction-based game of FIG. 1 may be used to perform data analytics for a daily fantasy sports game.

Figure 2:
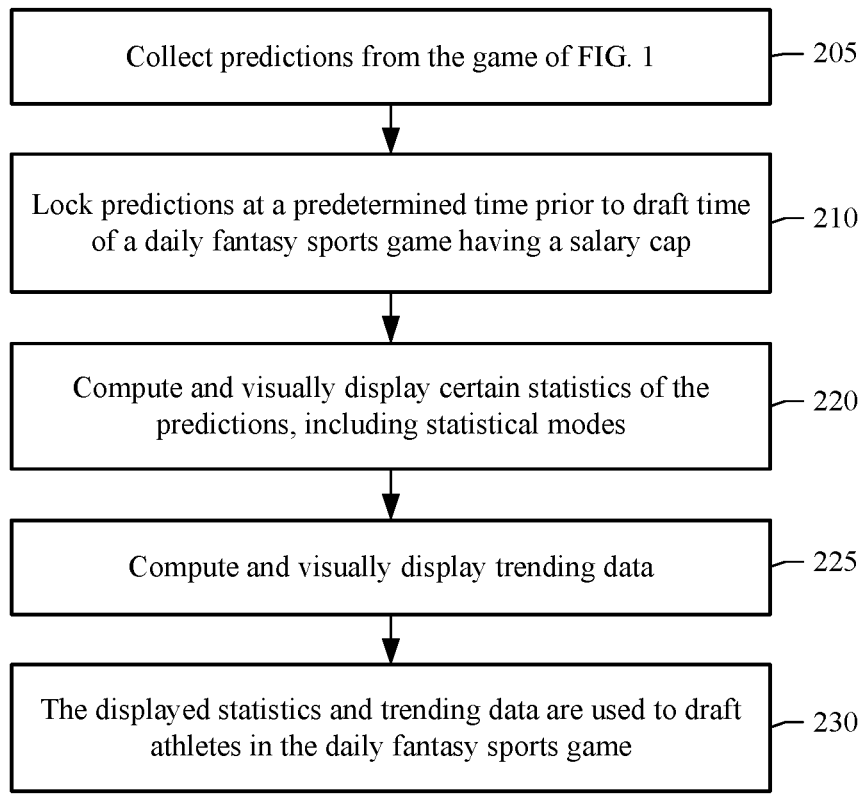
FIG. 2 is an illustration of a method of performing data analytics for a daily fantasy sports game.
Figure 3:
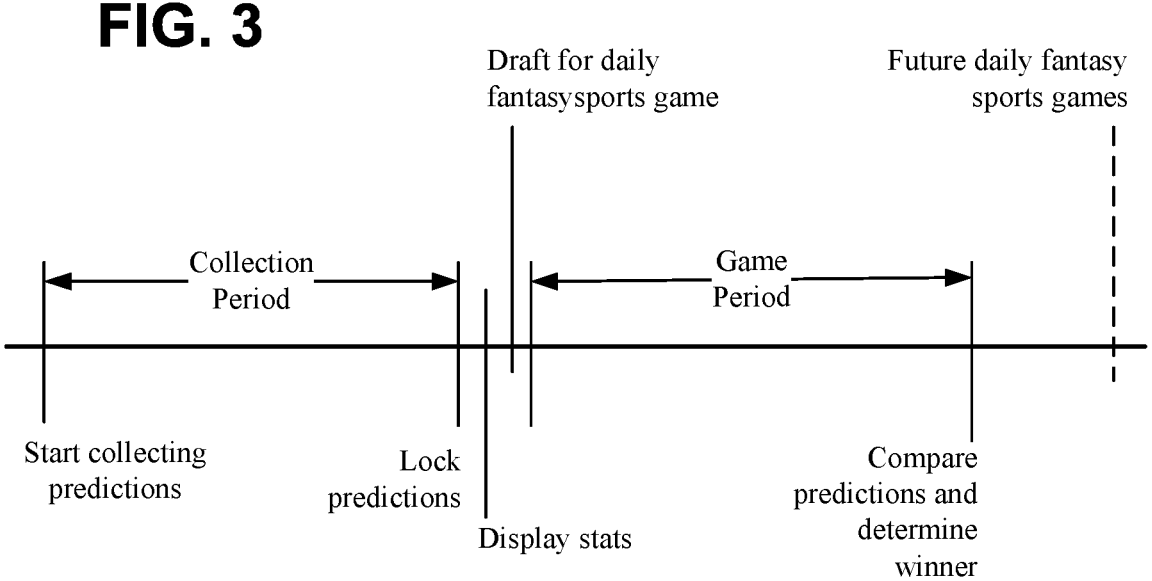
FIG. 3 is a timeline for the prediction-based game, the data analytics, and the daily fantasy sports game.

Reference is now made to FIGS. 2 and 3, which illustrate a method of using the game of FIG. 1 to perform data analytics for daily fantasy sports games. At block 205, from the prediction-based online game of FIG. 1, the sets of predictions by a multitude of online players are collected continuously over the collection period. If a third party is hosting the prediction-based game of FIG. 1, the predictions may be collected from that third party.

At block 210, the predictions are locked at the end of the collection period. This means that online players are locked out from submitting and/or changing their predictions.

At block 220, certain statistics of the predictions are computed and visually displayed to all of the players after the predictions have been locked, but prior to the start of the game period. For example, the statistics may include a statistical mode, which represents the numerical prediction that is most frequently submitted by players for each performance category, for each athlete, in each sport, each game period. The displayed statistics can provide insight as to who other people deem the most desirable athletes to draft. For instance, the statistical mode may indicate how other online players will value an athlete versus that athlete's salary cap figure.

At block 225, trending data may be computed from the statistics. For instance, a moving average of an athlete's statistical mode may be computed over a period of time. The trending data may be displayed with the statistics, prior to the start of the game period.

At block 230, the online players may use the displayed statistics and the displayed trending data to select athletes in a daily fantasy sports game having a salary cap. The statistics and the trending data may aid in salary cap valuations. For instance, the online players may use these analytics to decide on how much salary cap money to spend on particular athletes on all other fantasy sites that impose a salary cap.

The locking of the predictions and the display of the statistics and trending data may occur at a predetermined time before the start of the game period (for instance, where the game period and the fantasy sports game overlap). A predetermined time between 15 minutes and an hour provides an ideal tradeoff between maximizing the collection period and giving the online players enough time to use the displayed statistics and trending data for the daily fantasy sports game.

The displayed statistics and trending data may provide additional value to rookie contestants and novices. The displayed statistics and trending data may serve as a simple, instructive guide for learning why a majority of other online players make particular predictions. This guide may give online players who are rookie contestants and novices the confidence to enter into daily fantasy sports games.

The displayed statistics and trending data may also have value after the fantasy sports game has been played. They may serve as historical data for future daily fantasy sports game.

The following tables provide simple examples of statistical modes for the NFL MLB, and NBA. For instance, the statistical modes in Table 7 predict that QB1 will throw 10 completions and 0 touchdowns during the game period.

TABLE 7

| | NFL | |
|---|---|---|
| Quarterback | Number of pass completions predicted most frequently | Number of touchdown passes predicted most frequently |
| QB1 | 10 | 0 |
| QB2 | 20 | 3 |
| QB3 | 15 | 2 |

TABLE 8

| MLB | | |
|---|---|---|
| 1st Baseman | Number of hits predicted most frequently | Number of runs scored predicted most frequently |
| FB1 | 2 | 1 |
| FB2 | 0 | 0 |
| FB3 | 0 | 1 |

TABLE 9

| NBA | | |
|---|---|---|
| Center | Number of rebounds predicted most frequently | Number of blocked shots predicted most frequently |
| C1 | 10 | 1 |
| C2 | 12 | 4 |
| C3 | 5 | 2 |

Statistics other than statistical modes may be displayed. Other statistics include, but are not limited to, mean and variance. For instance, mean of passing yards is the average predicted performance, and variance indicates how dispersed the predictions are or whether they're in general agreement.

A method herein is not limited to the use of the prediction-based game of FIG. 1 as a source of predictions. Additional predictions may come from additional prediction-based games, and from handicapping by journalists, industry analysts, pundits, commentators, etc.

An example of additional prediction-based games are proposition bets ("prop bets"). A prop bet is a wager made on an individual player or specific event or milestone before or during a game, but does not directly affect the game's final outcome. The following are examples of prop bets: the number of goals a certain NHL player will score in a game soon to begin or a game already in progress; the number of balls/strikes that will be thrown by a certain baseball pitcher during a game later today; and the number of yards the next touchdown pass will cover during a football game in progress.

Figure 4:
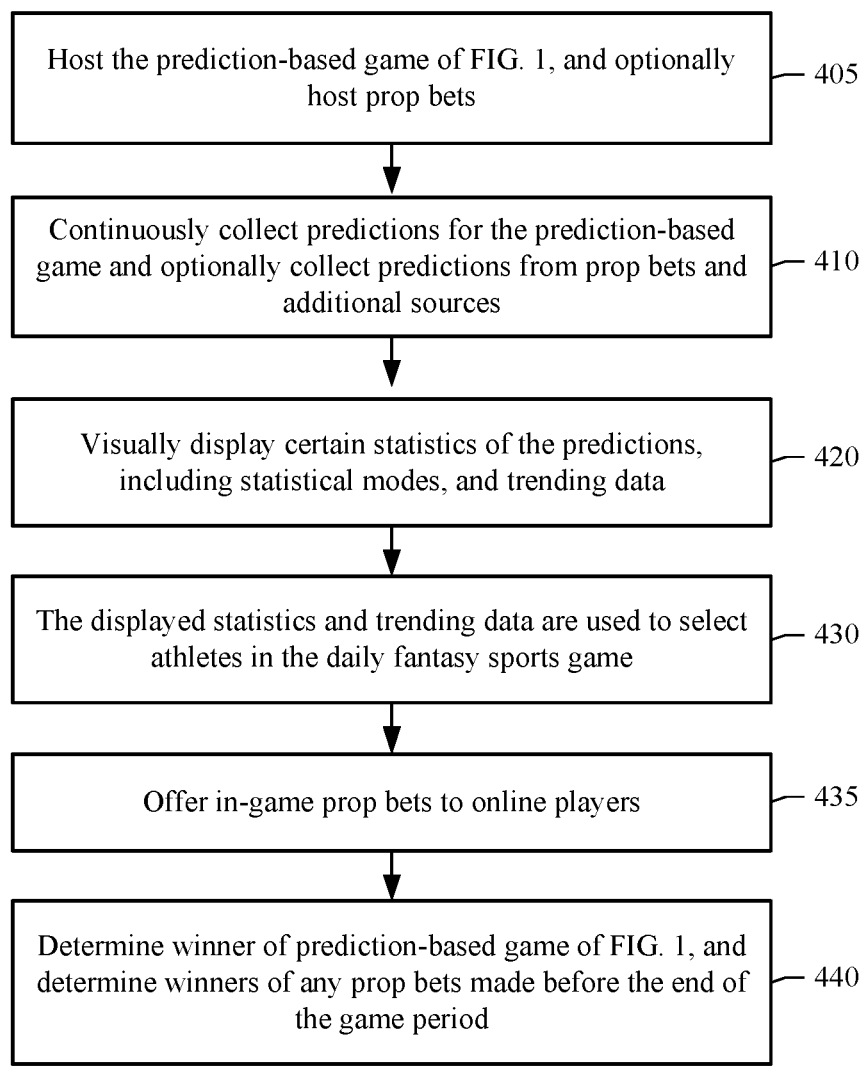
FIG. 4 is an illustration of a modified method of performing data analytics for a daily fantasy sports game.

Reference is made to FIG. 4, which illustrates a method of hosting the prediction-based game of FIG. 1 and using predictions from that game and predictions from prop bets. At block 405, the prediction-based game is hosted, and predictions are continuously collected during the collection period. Optionally, prop bets may be hosted.

At block 410, predictions are collected from the prediction-based game during a collection period. Predictions may also be collected from any prop bets and any additional sources.

As the predictions from the prop bets are being collected, they may be filtered to extract information relevant to the statistics. For instance, prop bets can reveal the athlete performance categories that users bet on most frequently, and predicted performances for certain athletes. Consider the following examples.

Pre-Game NFL Prop Bet: "How many total first downs will the Detroit Lions generate in today's upcoming game with the Green Bay Packers"? The wager will specify a number of first downs, which will be collected as a prediction.

Pre-Game MLB Prop Bet: "How many home runs will the New York Yankees hit, as a team, in today's game against the Chicago White Sox"? The wager will specify a number of home runs, which will be collected as a prediction.

Pre-Game NHL Prop Bet: "How many total points (goals plus assists) will the Edmonton Oilers' Connor McDavid tally in tonight's contest with the Toronto Maple Leafs"? The wager will specify a number of points, which will be collected as a prediction.

At block 420, certain statistics such as statistical modes of the predictions are computed and displayed visually. Trending data may also be computed from the statistics and displayed visually. Any predictions from prop bets and other sources can refine and improve the statistics and trending data.

At block 430, the displayed statistics, and trending data may be used to select athletes in a daily fantasy sports draft having a salary cap.

At block 435, in-game prop bets may be hosted and made available to online players. The online players can leverage the knowledge they gained from displayed stats to determine and set wagers for prop bets. The players can also leverage the knowledge to determine and set wagers for prop bets on other platforms. Consider the following three examples:

In-Game NFL Prop Bet: How many yards will Tennessee running back Derrick Henry rush for in the 4th quarter of his game, which is now in progress?

Displayed statistics reveal that Derrick Henry's mode is approximately 200 yards rushing per game. At half-time, Henry has 102 yards, so the statistical mode is factored into a prop bet of 25 yards in the 4th quarter.

In-Game NBA Prop Bet: How many three-point shots will Zion Williamson of New Orleans attempt in the second half of his game, which is now in progress?

Displayed statistics reveal that Zion is averaging five three-point shot attempts per game. As of the second quarter, he has only attempted one, and New Orleans is trailing. To get New Orleans back in the game, the statistical average is factored into a prop bet of at least four more three-pointers in the second half.

In-Game NFL Prop Bet: How many yards will Buffalo quarterback Josh Allen rush for in the Bills' next offensive series of his game, which is now in progress?

Displayed statistics reveal that although Josh Allen is a quarterback, he's currently averaging nearly as many rushing yards per game as passing yards per game. The game is now in the fourth quarter, Buffalo is trailing, and Allen is having trouble throwing the ball. Allen's rushing prowess is factored into a prop bet of a high number of rushing yards in his next offensive drive.

At block 440, after the game period has ended, the predictions are compared to actual performances of the athletes, and a winner is determined for the prediction-based game of FIG. 1. As for prop bets made before the end of the game period, winners are also determined.

Figure 5:
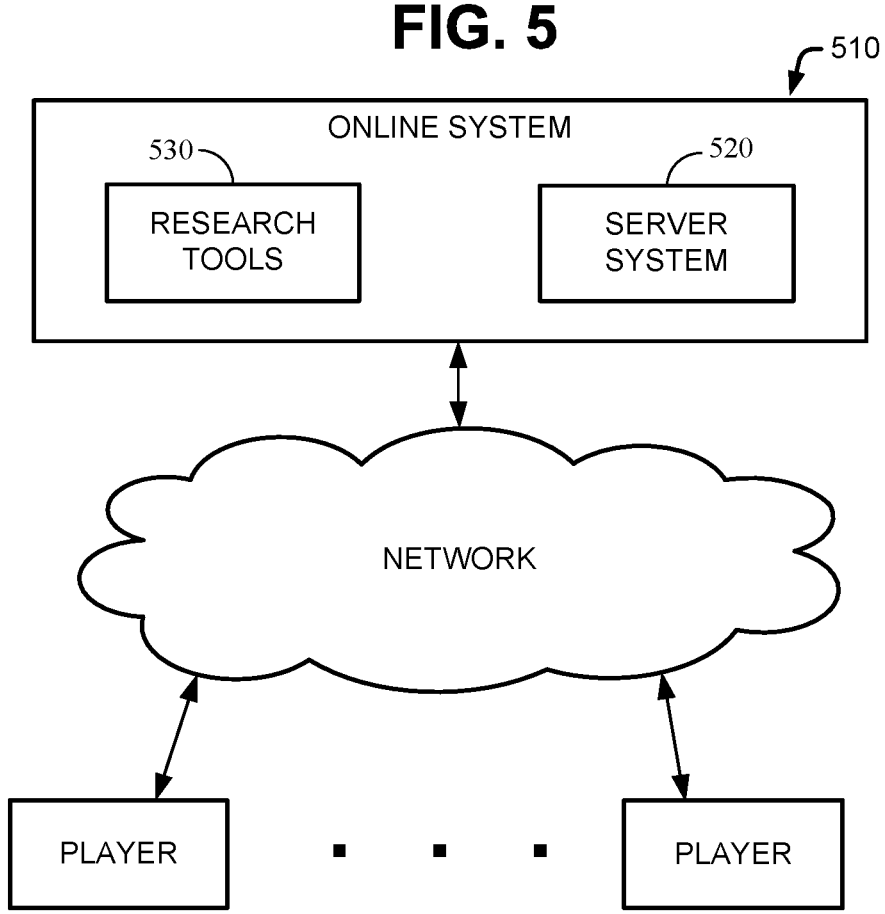
FIG. 5 is an illustration of a system for performing the data analytics.

Reference is now made to FIG. 5, which illustrates an online system 510 for performing data analytics for daily fantasy sports games. The online system 510 includes a server system 520 programmed to perform any of the methods herein. If the online system 510 is hosting the prediction-based game of FIG. 1, the server system 520 enables a multitude of players to log in via a network, choose at least one sport in which to compete, draft a roster of athletes, and submit numerical predictions for each performance category. If the online system 510 also offers prop bets during the collection period, it enables the multitude of players to submit their prop bets.

The server system 520 then continuously collects sets of predictions during the collection period by the multitude of online players prior to the start of game time; locks the predictions at a predetermined time prior to the start of the game period; and visually displays statistics of the predictions and trending data to all of the players after the predictions have been locked, but prior to the start of the game period. If the online system 510 is hosting the prediction-based game, the server system 520 compares the predictions to actual performances of the athletes after the game period has ended; and determines a winner among the players according to whose predictions are closest to the actual performances. The server system 520 may also determine one or more runner ups. The server system 520 or another system may make a payout to each winning player and runner up.

The online system 510 may also host prop bets during the game period.

If a third party is hosting the prediction-based game of FIG. 1, the server system 520 may instead collect the predictions from that third party. If a third party is hosting prop bets, the server system 520 may collect predictions for the prop bets from that third party.

The online system 510 may include traditional research tools 530. The traditional research tools 530 may provide information for formulating the predictions. This information may include, without limitation, historical performance of athletes, information about home field advantage, strengths/weaknesses of opponents, game plans, injury reports, weather, etc. The traditional research tools 530 may also be provided by third party vendors.

The invention claimed is:

1. A method of performing data analytics for a fantasy sports game, the method comprising:
   continuously collecting sets of predictions from online players for a fantasy sports game from an online prediction-based game, the sets including predictions of performances of real or virtual athletes in at least one performance category; using statistics to form wagers made on an occurrence of an event before or during a game, wherein the event does not constitute the final outcome of the fantasy sports game;
   receiving and using predictions from prop bets to refine the statistics; and
   at least prior to a drafting of the real or virtual athletes for the fantasy sports game, visually displaying statistics of the predictions that have been collected from the online players to assist in the drafting.

2. The method of claim 1, further comprising computing trending data from the statistics.

3. The method of claim 2, further comprising visually displaying the trending data.

4. The method of claim 1, further comprising locking the predictions prior to the drafting.

5. The method of claim 1, further comprising providing research tools to the online players to assist with the predictions.

6. A method of prediction-based game, the method comprising:
   continuously collecting sets of predictions from online players, the sets including predictions of performances of real or virtual athletes in at least one performance category;
   using statistics to form wagers made on an occurrence of an event before or during a game, wherein the event does not constitute the final outcome of the fantasy sports game;
   receiving and using predictions from prop bets to refine the statistics;
   computing trending data from the statistics of the predictions collected from the online players, and visually displaying the trending data; and
   determining a winner among the online players according to whose predictions are closest to actual performances of the real or virtual athletes.

7. The method of claim 6, further comprising displaying the trending data prior to a drafting of the real or virtual athletes of the fantasy sports game to assist in the drafting.

8. The method of claim 6, further comprising receiving and using predictions from prop bets to compute the displayed statistics.

9. A data analytics system for fantasy sports games, the data analytics system comprising a server system programmed to:
   collect sets of predictions from online players for a fantasy sports game from a prediction-based game, the sets including predictions of performances of real or virtual athletes in at least one performance category;
   using statistics to form wagers made on an occurrence of an event before or during a game, wherein the event does not constitute the final outcome of the fantasy sports game;
   receiving and using predictions from prop bets to refine the statistics; and
   at least prior to a drafting of the real or virtual athletes for the fantasy sports game, visually displaying statistics of the predictions that have been collected from the online players to assist in the drafting.

10. The data analytics system of claim 9, wherein the server system is further programmed to compute trending data from the statistics.

11. The data analytics system of claim 10, wherein the trending data is visually displayed to assist in the drafting.

12. The data analytics system of claim 9, wherein the server system is further programmed to receive and use predictions from prop bets to refine the statistics.

13. The data analytics system of claim 9, wherein the server system is further programmed to host the prediction-based game.

14. The data analytics system of claim 9, wherein the server system is further programmed to compare the predictions to actual performances of the athletes; and determine a winner among the online players according to whose predictions are closest to the actual performances.

15. The data analytics system of claim 9, wherein the server system is programmed to make research tools accessible to the online players to assist with the predictions.

16. The data analytics system of claim 9, wherein the server system is further programmed to continuously collect sets of predictions.

17. The data analytics system of claim 9, wherein the online players play the prediction-based game and the fantasy sports game.

18. The data analytics system of claim 9, wherein the statistics include a statistical median or mode.

* * * * *